(12) United States Patent
Nishitani

(10) Patent No.: US 7,896,996 B2
(45) Date of Patent: Mar. 1, 2011

(54) PNEUMATIC TIRE AND PRODUCING METHOD OF PNEUMATIC TIRE

(75) Inventor: Kazuma Nishitani, Osaka (JP)

(73) Assignee: Toyo Tire & Rubber Co., Ltd. (JP)

( * ) Notice: Subject to any disclaimer, the term of this patent is extended or adjusted under 35 U.S.C. 154(b) by 833 days.

(21) Appl. No.: 11/466,376

(22) Filed: Aug. 22, 2006

(65) Prior Publication Data

US 2007/0044885 A1    Mar. 1, 2007

(30) Foreign Application Priority Data

Aug. 23, 2005    (JP)    ............... 2005-241269

(51) Int. Cl.
*B29D 30/06* (2006.01)
*B29D 30/20* (2006.01)
*B60C 5/00* (2006.01)
*B60C 5/14* (2006.01)

(52) U.S. Cl. .............. 156/110.1; 156/123; 152/510
(58) Field of Classification Search .......... 156/123, 156/110.1; 152/510
See application file for complete search history.

(56) References Cited

U.S. PATENT DOCUMENTS

| | | | |
|---|---|---|---|
| 6,261,399 B1 * | 7/2001 | Roesgen et al. | 156/123 |
| 6,398,893 B1 * | 6/2002 | Shida | 156/130 |
| 2002/0134490 A1 * | 9/2002 | Suzuki | 156/123 |

FOREIGN PATENT DOCUMENTS

| | | | |
|---|---|---|---|
| JP | 9-29858 | | 2/1997 |
| JP | 2000-94542 A | | 4/2000 |
| JP | 2002-18973 | * | 2/2002 |
| JP | 2002-79590 A | | 3/2002 |
| JP | 2002-160508 A | | 6/2002 |
| JP | 2002-178415 A | | 6/2002 |

* cited by examiner

*Primary Examiner*—Justin Fischer
(74) *Attorney, Agent, or Firm*—Knobbe Martens Olson & Bear LLP

(57) ABSTRACT

In the producing method of the pneumatic tire, a step in which a wide rubber ribbon having a width of 60 to 110 mm is wound in a circumferential direction to form annular bodies is repeated a plurality of times, an inner liner member in which the annular bodies are continuously provided in a widthwise direction is formed, and the inner liner member is disposed on a tire inner peripheral surface as an inner liner layer of a pneumatic tire.

10 Claims, 4 Drawing Sheets

PNEUMATIC TIRE AND PRODUCING METHOD OF PNEUMATIC TIRE

BACKGROUND OF THE INVENTION

1. Field of the Invention

The present invention relates to a pneumatic tire in which a crack is prevented from being generated in an inner peripheral surface of the tire, and to a producing method of the pneumatic tire.

2. Description of the Related Art

Generally, an inner liner member which becomes an inner liner layer of a pneumatic tire is formed by rolling an unvulcanized rubber composite into predetermined width and thickness using a calender, cutting the obtained sheet-like unvulcanized rubber composite into necessary length, and winding the same around an outer periphery of a forming drum. According to this method, it is possible to handle tires of various sizes by changing the rolling width of the calender appropriately, but there is a problem that if the calender is used, the producing equipment is increased in size.

Hence, it can be conceived that an extruder is used instead of the calender, and the sheet-like unvulcanized rubber composite is extruded with a width corresponding to a tire size. In such a case, however, the die shape becomes extremely flat, a discharge pressure of rubber at its central portion becomes higher than pressures at both edges thereof and thus, there is a problem that the central portion of the unvulcanized rubber composite is extruded faster than the both edges, and cracks are produced in both edges which receive tensile force. Further, since it is necessary to prepare a die corresponding to each tire size and use the same appropriately, the number of parts is increased, and the operation becomes complicated due to exchanging operation of the die.

As disclosed in a Japanese Patent Application Laid-open No. 2002-178415, for example, it is known that a rubber ribbon having small width and thickness made of unvulcanized rubber composite is spirally wound along a circumferential direction a plurality of times to form an inner liner member. According to the ribbon winding technique, it is possible to precisely and easily form a desired cross section shape. When a pneumatic tire is produced using an inner liner member formed by the ribbon winding technique, however, it was found that there was a problem that a crack is easily generated from the ribbon interface formed in the tire inner peripheral surface, and the endurance of the tire is deteriorated. Especially in the case of a pneumatic tire having tire cross section height of less than 110 mm and a small aspect ratio (tire cross section height/tire cross section width), large distortion is applied in a region extending from the vicinity of the end of the belt layer to the tire cross section maximum width position during running, a crack generated in the inner peripheral surface in such a region was outstanding.

A Japanese Patent Application Laid-open No. 2002-160508 discloses a pneumatic tire in which an inner liner member is formed by the ribbon winding technique, and an insulation rubber extending from the vicinity of the end of the belt layer to the tire cross section maximum width position is disposed between the inner liner member and a carcass ply. According to this pneumatic tire, however, since the ribbon interface is uniformly formed in the tire inner peripheral surface, the problem of a crack in the inner peripheral surface can not be solved.

A Japanese Patent Application Laid-open No. 2002-79590 discloses a method for forming a tire inner peripheral surface of the inner liner member by a surface layer formed by winding a rubber ribbon whose width is less than 40 mm with a predetermined superposed width. According to this method, however, the relatively narrow rubber ribbon must be used, and the tire inner peripheral surface is appropriately formed with the rubber ribbon, and a crack can not be prevented from being generated in the inner peripheral surface.

A Japanese Patent Application Laid-open No. 2000-94542 discloses a method in which rubber ribbons are wound around both edges of an integrally extruded rubber extrudate to form an inner liner member. However, with respect to a problem of a crack in the inner peripheral surface, it is very important to reduce the ribbon interface in the inner peripheral surface of the region where large distortion is applied, but this method is for reducing the number of winding steps of the rubber ribbon to enhance the productivity by using the rubber extrudate, this patent document does not disclose the solving means of the problem.

A Japanese Patent Application Laid-open No. H9-29858 discloses a method in which a rubber ribbon extruded with a width of 50 to 300 mm is spirally wound along the circumferential direction to form the inner liner member. According to this method, however, it is necessary to cut unnecessary portions of a winding-start end and a winding-completion terminal end, and this is not preferable in terms of operability and cost. It is also possible to wind the rubber ribbon such that a portion which must be cut is not formed, but when a relatively wide rubber ribbon is used, superposed portions 25 of a ribbon R or a gap 26 shown in FIG. 7 are unevenly formed in the vicinity of the winding-start end or the winding-completion terminal end and thus, there is a problem that the weight balance is deteriorated.

SUMMARY OF THE INVENTION

The present invention has been accomplished in view of the above circumferences, and it is an object of the invention to provide a producing method of a pneumatic tire in which a crack can be prevented from being generated in an inner peripheral surface of the tire, and to provide such a pneumatic tire.

The object can be achieved by the present invention having the following structure. That is, the present invention provides a producing method of a pneumatic tire wherein a step in which a wide rubber ribbon having a width of 60 to 110 mm is wound in a circumferential direction to form annular bodies is repeated a plurality of times, an inner liner member in which the annular bodies are continuously provided in a widthwise direction is formed, and the inner liner member is disposed on a tire inner peripheral surface as an inner liner layer.

According to the producing method of the pneumatic tire of the present invention, a plurality of annular bodies of wide rubber ribbons having a width of 60 to 110 mm are continuously provided in the widthwise direction to form an inner liner member. With this, it is possible to largely reduce the ribbon interface formed in the tire inner peripheral surface, and a crack in the inner peripheral surface generated by the ribbon interface can be suppressed. The width of the inner liner member can appropriately be changed by adjusting the number of the annular bodies or the superposed margin.

Therefore, it is possible to handle a plurality of tire sizes using a single die and thus, the number of parts is not increased and the operation is not complicated. Unlike the case where the wide rubber ribbon is spirally wound, it is unnecessary to cut an unnecessary portion, and the weight balance is not deteriorated as described above.

In the above description, it is preferable that the annular bodies are continuously provided so that the tire inner peripheral surface of the region extending at least from the vicinity of the end of the belt layer to the tire cross section maximum width position is formed by a single annular body when the tire is formed. With this, it is possible to reliably reduce the ribbon interface formed in the tire inner peripheral surface in the region, and it is possible to suppress the generation of the crack in the inner peripheral surface in a region where a large distortion is applied during running in the case of a pneumatic tire having a small aspect ratio.

In the above configuration, it is preferable that the number of annular bodies is three to six. With this, it is possible to reduce the ribbon interface formed between the annular bodies to a minimum, to effectively suppress a crack in the inner peripheral surface, and to efficiently form the inner liner member.

In the above configuration, it is preferable that joint portions of the wide rubber ribbon are deviated in the circumferential direction at approximately equal distances for each of the annular bodies. In the present invention, the joint portion to which the winding-start end and the winding-completion terminal end of the wide rubber ribbon are connected is formed in each of the annular bodies, and there is a tendency that the thickness of the joint portions is increased as compared with other portions. According to the above configuration of the invention, since the joint portions are deviated in the circumferential direction at approximately equal distances from one another for each of the annular bodies, it is possible to excellently secure the uniformity of the inner liner member.

A pneumatic tire of the present invention comprises a carcass layer disposed such as to extend between a pair of beads, a belt layer disposed outside of a tread portion of the carcass layer, and an inner liner layer which is disposed inside of the tire with respect to the carcass layer and in which a plurality of annular bodies of the wide rubber ribbon having a width of 60 to 110 mm are continuously provided in the widthwise direction. Since the pneumatic tire of the invention comprises the inner liner layer in which the plurality of annular bodies of the wide rubber ribbon having the width of 60 to 110 mm are continuously provided, the ribbon interface formed in the tire inner peripheral surface is largely reduced, and a crack in the inner peripheral surface generated by the ribbon interface can suppressed.

In the above configuration, it is preferable that a tire cross section height is less than 110 mm, a tire inner peripheral surface in a region extending at least from the vicinity of an end of the belt layer to a tire cross section maximum width position is formed of one of the annular bodies. With this configuration, the ribbon interface of the tire inner peripheral surface in the region where a large distortion is applied during running of the pneumatic tire having the tire cross section height of less than 110 mm is effectively reduced. Thus, in a tire in which a crack in the inner peripheral surface is especially serious, it is possible to effectively suppress the generation of the crack.

DESCRIPTION OF PREFERRED EMBODIMENT

Figure 1:
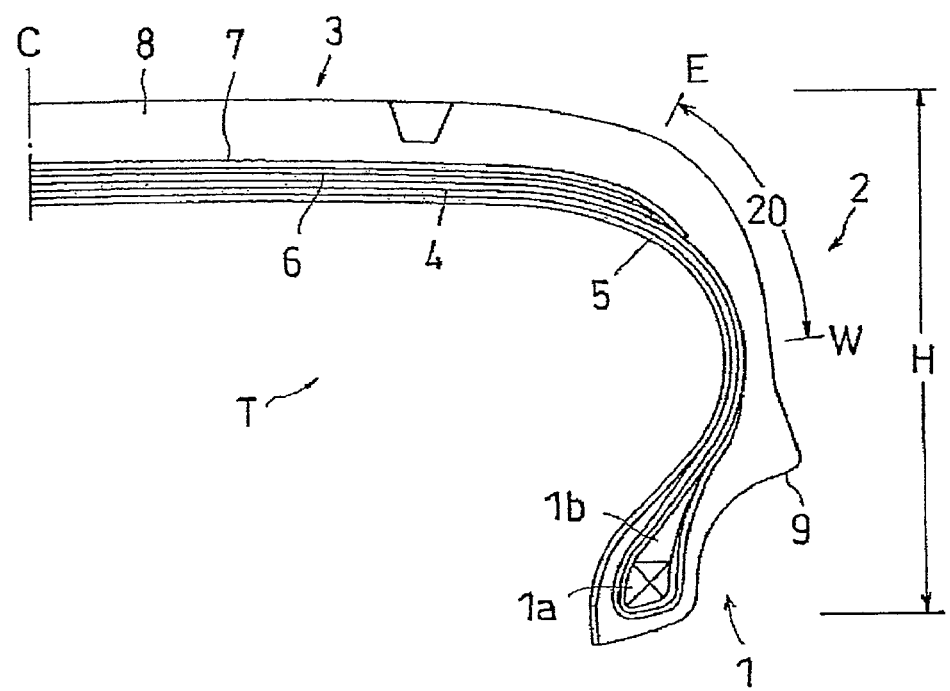
FIG. 1 is a semi-sectional view of a meridian showing one example of a pneumatic tire of the present invention.
Figure 2:
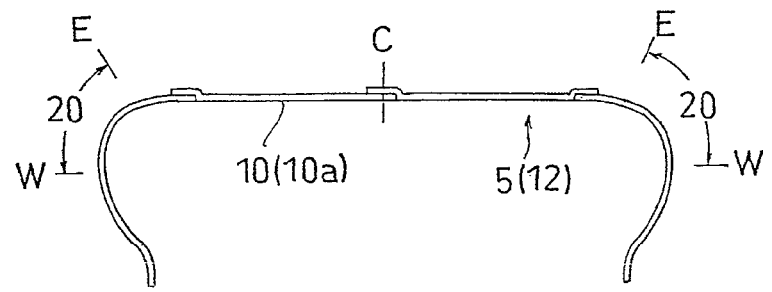
FIG. 2 is a schematic sectional view showing a structure of an inner liner layer.

An embodiment of the present invention will be explained with reference to the drawings. FIG. 1 is a semi-sectional view of a meridian showing one example of a pneumatic tire of the invention. FIG. 2 is a schematic sectional view showing a structure of an inner liner layer of the pneumatic tire.

A tire T includes a pair of bead portions 1, sidewall portions 2 respectively extending from the bead portions 1 radially outward of the tire, and a tread portion 3 connected to radially outer ends of the sidewall portions 2 through shoulder portions. An annular bead 1*a* which is a convergence body of a bead wire, and a bead filler 1*b* disposed radially outward of the bead 1*a* are disposed in the bead portion 1. A carcass layer 4 comprises at least one carcass ply in which cords such as polyester cords are disposed in parallel to each other at an angle of about 90° with respect to the tire equator C. In this embodiment, two carcass plies extends between the pair of beads 1*a*.

A belt layer 6 for reinforcing the tire by hoop effect is disposed outside of a tread portion of the carcass layer 4. The belt layer 6 is formed in such a manner that two belt plies in which steel cords are inclined by about 20° with respect to the tire equator C are laminated such that the inclination angles of the steel cords are opposite from each other. A belt reinforcing layer 7 for reinforcing the hoop effect is disposed outside of the tire of the belt layer 6, and a tread rubber 8 is disposed further outer side of the tire.

An inner liner layer 5 for holding an internal pressure of the tire is disposed inside of the tire of the carcass layer 4. As shown in FIG. 2, the inner liner layer 5 comprises a plurality of annular bodies 10 of the wide rubber ribbon 10*a* having a width of 60 to 110 mm which are continuously provided in the widthwise direction. In this embodiment, the inner liner layer 5 comprises four annular bodies 10.

A tire cross section height H of the tire T is less than 110 mm. A region 20 extends from the vicinity of the end E of the belt layer 6 to the tire cross section maximum width position W. A large distortion is applied to the region 20 during running. The tire inner peripheral surface of the region 20 is the single annular body 10. With this, the ribbon interface formed in the tire inner peripheral surface of the region 20 is reduced, and a crack which may be generated in the inner peripheral surface due to the ribbon interface is suitably restrained. Here, the tire cross section maximum width position W means a maximum width position of the tire profile in the tire meridian cross section, and a rim protector 9 swelling outward shown in FIG. 1 is not taken into consideration.

Figure 3:
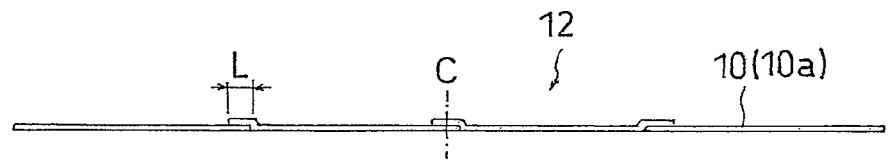
FIG. 3 is a sectional view showing an inner liner member.
Figure 4:
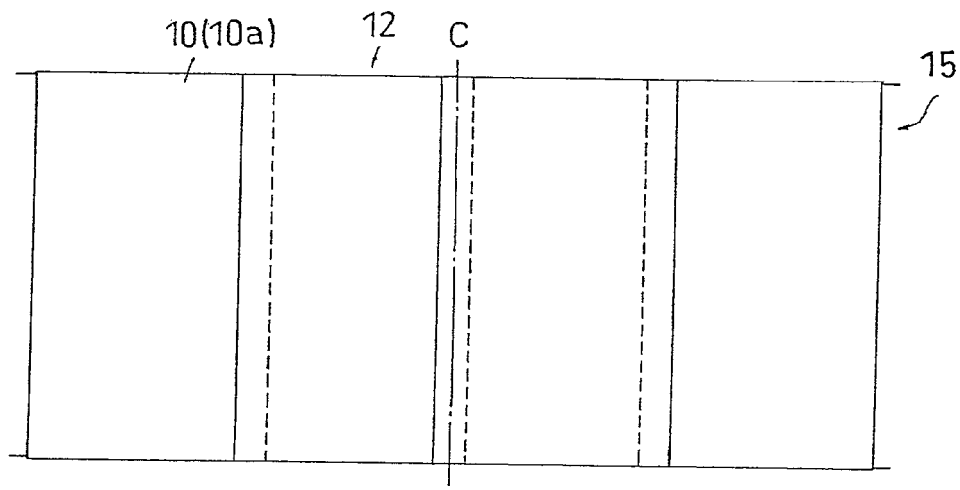
FIG. 4 is a plan view of the inner liner member.

Next, a producing method of the pneumatic tire will be explained. First, the inner liner member 12 shown in FIGS. 3 and 4 is formed on an outer peripheral surface of a forming drum 15. More specifically, the wide rubber ribbon 10*a* is once wound in parallel to the circumferential direction to form the annular bodies 10, and this step is repeated four times in this embodiment, edges of the annular bodies 10 are continuously provided in the widthwise direction, thereby forming the inner liner member 12. At that time, the annular bodies 10 are disposed such that a single annular body 10 forms the tire inner peripheral surface in at least the region 20 when the tire is formed.

Figure 5:
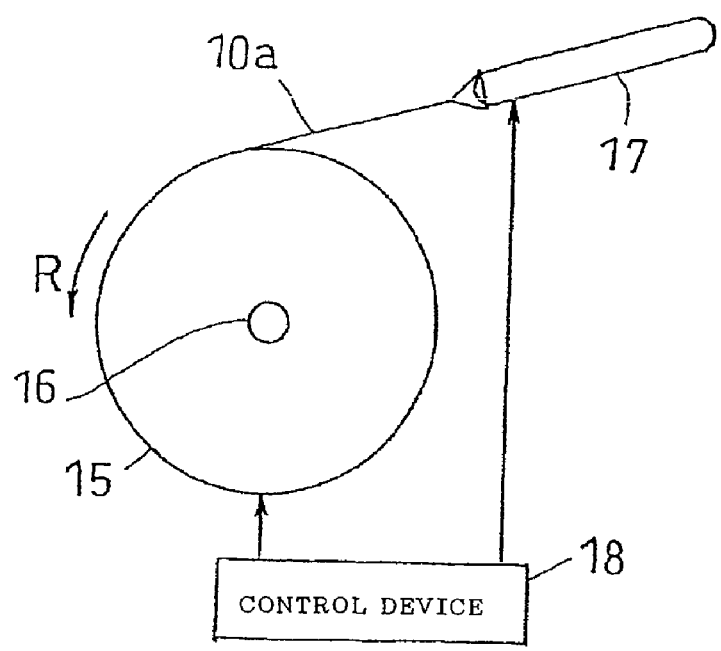
FIG. 5 is a schematic view of a structure showing a device which winds a rubber ribbon.

The inner liner member 12 can be formed using a device shown in FIG. 5 for example. The forming drum 15 can rotate in the R-direction around a shaft 16. The forming drum 15 can move horizontally in an axial direction of a drum by a moving mechanism (not shown). The rubber ribbon supply apparatus 17 includes an extruder which can extrude an unvulcanized rubber composite through a die having a predetermined shape, and has a function for supplying the wide rubber ribbon 10a to the forming drum 15. A control device 18 has a function for controlling the operation of the rubber ribbon supply apparatus 17, and rotation and horizontal motion of the forming drum 15.

According to the above apparatus, a winding-start end of the wide rubber ribbon 10a is fixed to the outer peripheral surface of the forming drum 15 and in this state, the forming drum 15 is rotated once, the wide rubber ribbon 10a is cut into a predetermined length, the obtained winding-completion terminal end is superposed on the winding-start end and crimped, thereby forming the annular bodies 10 of the wide rubber ribbon 10a. Then, the forming drum 15 is horizontally moved and the winding position is changed, and the annular bodies 10 are formed in the above manner, this step is repeated and the inner liner member 12 in which the annular bodies 10 are continuously provided in the widthwise direction is formed.

The inner liner member 12 may be formed of annular bodies of the wide rubber ribbons 10a having different widths, but it is preferable that the inner liner member 12 is formed of annular bodies of the wide rubber ribbons 10a having the same width. In such a case, if the number of annular bodies 10 or the superposing margin of the wide rubber ribbons 10a (annular bodies 10) is adjusted, it is possible to form the inner liner member 12 corresponding to each tire size. With this, one die can commonly be used for a plurality of tires, the number of parts can be reduced and the operation efficiency can be enhanced.

It is preferable that 5 mm or more superposing margin L of the wide rubber ribbon 10a is secured at the superposed portion closest to the region 20 so as to more reliably suppress the generation of a crack in the inner peripheral surface. In this embodiment, the number of annular bodies 10 is four and the number of superposing margins is three. Thus, it is preferable that 5 mm or more superposing margin is secured at the superposed portions in both sides in the widthwise direction closest to the region 20, and a desired width of the inner liner member 12 is obtained by adjusting the superposing margin at a central superposed portion. Superposing margins are secured at all of the superposed portions capable of sufficiently holding the internal pressure of the tire.

After the inner liner member 12 is formed, the same step as the conventional tire producing step can be carried out. That is, a carcass ply having a predetermined width is wound around the outer periphery of the inner liner member 12 and the carcass ply is formed into a cylindrical shape, an end of the carcass ply is wound up around the end of the carcass ply through beads 1a which is fitted over the vicinity of the end and then, a central portion of the carcass ply is swelled and deformed while reducing a distance between the beads 1a. With this operation, a central portion of the inner liner member 12 is also swelled and deformed, and the inner liner member 12 is deformed into a shape extending along the tire inner peripheral surface as shown in FIG. 2 from the shape shown in FIG. 3. Then, a belt layer 6, a belt reinforcing layer 7 and the tread rubber 8 are disposed outside of the tread portion 3 of the carcass ply, another rubber member is pasted if necessary and a raw tire is formed. The inner liner member 12 is disposed on the tire inner peripheral surface and becomes the inner liner layer 5. At least the tire inner peripheral surface of the region 20 is formed by the single annular body 10.

The wide rubber ribbons 10a used in the present invention has a width of 60 to 110 mm, and preferably 65 to 100 mm. If the annular bodies 10 of the relatively wide rubber ribbons 10a are continuously provided, it is possible to efficiently reduce the ribbon interface formed in the tire inner peripheral surface and to form the inner liner member 12 with the small number of windings. If the width of the wide rubber ribbon 10a is less than 60 mm, there is a tendency that the effect for reducing the ribbon interface to suppress the crack in the inner peripheral surface is deteriorated. If the width exceeds 110 mm, the superposing margin of the wide rubber ribbon 10a is excessively increased, and the weight and the cost are increased needlessly. Besides, there is a tendency that cracks are easily produced in the both edges of the wide rubber ribbon. In a pneumatic tire having the tire cross section height of less than 110 mm, if the width of the wide rubber ribbon 10a is 110 mm, it is sufficiently possible to form a tire inner peripheral surface of the region 20.

The wide rubber ribbon 10a having the thickness of 0.5 to 1.4 mm is used, for example, depending upon the size of the inner liner member 12, but the invention is not especially limited to this. In the invention, the wide rubber ribbons 10a constituting the annular bodies 10 may have the same thicknesses or wide rubber ribbons 10a having different thicknesses may be used. If the thickness of the annular body 10 forming the tire inner peripheral surface in the region 20 is relatively thick, it is possible to effectively suppress the generation of a crack in the inner peripheral surface. If a thickness of an annular body 10 near the tire equator C away from the region 20 is relatively small, the tire weight can be reduced.

The cross section shape of the wide rubber ribbon 10a is not especially limited, but it is preferable that the wide rubber ribbon 10a is of a trapezoidal shape provided at its side with an inclined surface. With this shape, it becomes easy to wind the wide rubber ribbon 10a around the edge of the annular body 10, and a difference in a joint between adjacent annular bodies 10 can be suppressed.

It is preferable that the number of annular bodies 10 is three to six. With this, the annular bodies of relatively wide rubber ribbons are continuously provided and the inner liner member 12 is formed. Therefore, the ribbon interface formed in the tire inner peripheral surface can efficiently be reduced, and the inner liner member 12 can be formed with the small number of windings. If the number of the annular bodies 10 is less than three, there is a tendency that the width of the wide rubber ribbon 10a becomes large and the problems of weight, cost and cracks in the both edges become serious in some cases. If the number of the annular bodies 10 exceeds six, there is a tendency that the effect for reducing the ribbon interface to suppress the crack in the inner peripheral surface is deteriorated.

In the embodiment, both annular bodies 10 on the both sides in the widthwise direction closest to the region 20 are formed faster than an annular body 10 close to the tire equator C at the central portion of the tire, and the edge thereof is disposed at the inner peripheral side in the superposed portion. Therefore, the ribbon interface is formed on a side where the ribbon interface is away from the region 20, and the crack in the inner peripheral surface is more preferably suppressed.

Figure 6:
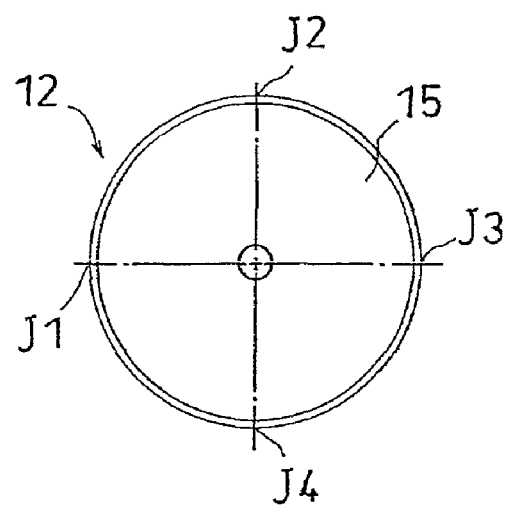
FIG. 6 is a schematic side view of a forming drum.
Figure 7:
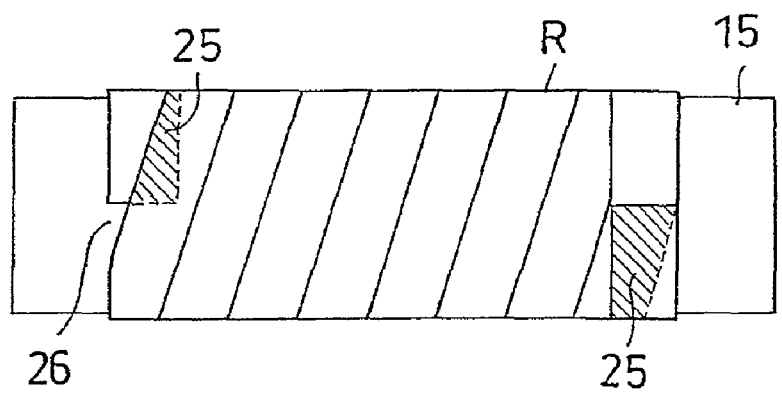
FIG. 7 is a plan view used for explaining a conventional producing method.

Each annular body 10 includes a joint portion at which the winding-start end and the winding-completion terminal end of the wide rubber ribbon 10a are connected to each other. In the embodiment, four joint portions J1 to J4 are formed. As shown in FIG. 6, the joint portions J1 to J4 are disposed at equal distances from one another such that they are deviated in the circumferential direction for each annular body 10. Thus, uniformity of the inner liner member 12 is excellently secured. This disposition can be carried out by rotating the forming drum by a predetermined amount when the winding-start end of the wide rubber ribbon 10a is fixed, and by deviating the joint portion through a predetermined angle.

Other Embodiments (1) In the previous embodiment, the annular bodies on the both sides in the widthwise direction are formed faster than the central annular body, but the forming order of the annular bodies is not especially limited in the present invention. For example, the annular bodies may be formed continuously and the inner liner members may be formed sequentially from the end. In such a case, since a distance through which the forming drum horizontally moves is shortened, the operation efficiency can be enhanced.

(2) Although the four joint portions J1 to J4 are disposed at equal distances from one another in the circumferential direction in the previous embodiment, the present invention is not limited to this, and the joint portions may be disposed at the same locations in the circumferential direction. In such a case, if the joint portions disposed linearly are pressed by crimping roller, the joint portions can collectively be crimped, and the operation efficiency can be enhanced.

Examples

To concretely show the effect of the invention, an endurance test was carried out. The test will be explained below. The test was carried out in accordance with a method specified in JISD4230, and a relation between traveled distance and trouble was searched using test tires of tire size 225/35ZR20 97W (tire cross section height of 79 mm) having a tire structure shown in FIG. 1.

A narrow rubber ribbon (width of 25 mm and thickness of 0.7 mm) was spirally wound along the tire circumferential direction to form an inner liner member, a pneumatic tire having an inner liner layer comprising the inner liner member was prepared as a conventional example. Four annular bodies of wide rubber ribbons (width of 95 mm and thickness of 0.7 mm) were continuously provided in the widthwise direction to form an inner liner member, and a pneumatic tire having the inner liner layer comprising the inner liner member was prepared as the embodiment. A test result is shown in Table 1.

TABLE 1

|  | Conventional example | Embodiment |
|---|---|---|
| Traveled distance/trouble | 7000 km/inner surface crack | 12000 km/no trouble |

As shown in Table 1, in the conventional example, when the traveled distance exceeds 7000 km, a crack was found in the tire inner peripheral surface. This crack was generated in the tire inner peripheral surface of a region extending from the vicinity of the end of the belt layer to the tire cross section maximum width position in the circumferential direction along the interface of the rubber ribbon. In the embodiment, no trouble such as a crack was found even when the traveled distance exceeds 12000 km. From the above result, it can be found that a crack is prevented from being generated in the inner peripheral surface and the endurance is more excellent as compared with the conventional example.

What is claimed is:

1. A producing method of a pneumatic tire, comprising winding a wide rubber ribbon having a width of 60 to 110 mm in parallel to a circumferential direction to form annular bodies, repeating the winding a plurality of times so as to form an inner liner member in which the annular bodies are continuously provided in a widthwise direction, wherein the inner liner member is disposed on a tire inner peripheral surface as an inner liner layer wherein each annular body comprises a single winding of the wide rubber ribbon and having a winding-start end and a winding-completion terminal end, and annular bodies at both ends of a forming drum are formed prior to an annular body therebetween, wherein each of said annular bodies has the same width and the number of annular bodies is four.

2. The producing method of the pneumatic tire according to claim 1, wherein the annular bodies are continuously provided such that the tire inner peripheral surface in a region extending at least from the vicinity of an end of a belt layer to a tire cross section maximum width position is formed of one of the annular bodies when the tire is formed.

3. The producing method of the pneumatic tire according to claim 1, wherein joint portions, to which the winding-start end and the winding-completion terminal end of the wide rubber ribbon are connected, are deviated in the circumferential direction at approximately equal distances for each of the annular bodies.

4. A pneumatic tire comprising:

a carcass layer disposed such as to extend between a pair of beads, a belt layer disposed outside of a tread portion of the carcass layer, and an inner liner layer which is disposed inside of the tire with respect to the carcass layer and in which a plurality of annular bodies of the wide rubber ribbon having a width of 60 to 110 mm wound in parallel to a circumferential direction are continuously provided in the widthwise direction wherein each annular body comprises a single winding of the wide rubber ribbon and having a winding-start end and a winding-completion terminal end and annular bodies at both ends of a forming drum are formed prior to an annular body therebetween, wherein each of said annular bodies has the same width and the number of annular bodies is four.

5. The pneumatic tire according to claim 4, wherein a tire cross section height is less than 110 mm, a tire inner peripheral surface in a region extending at least from the vicinity of an end of the belt layer to a tire cross section maximum width position is formed of one of the annular bodies.

6. The pneumatic tire according to claim 4, wherein joint portions, to which the winding-start end and the winding-completion terminal end of the wide rubber ribbon are connected, are deviated in the circumferential direction at approximately equal distances for each of the annular bodies.

7. A method of producing a pneumatic tire comprising:

(i) winding a wide rubber ribbon having a width of 60 mm to 110 mm in parallel to a circumferential direction to form an annular body, said annular body comprises a single winding of the wide rubber ribbon and having a winding-start end and a winding-completion terminal end, with a joint portion to which the winding-start end and the winding-completion terminal end of the wide rubber ribbon are connected;

(ii) winding a next wide rubber ribbon having a width of 60 mm to 110 mm in parallel to the circumferential direction to form a next annular body with a joint portion, to which the winding-start end and the winding-completion terminal end of the wide rubber ribbon are connected, next to the annular body wherein the annular body and the next annular body have sides overlapping in a widthwise direction; and (iii) repeating step (ii) to form an inner liner layer, wherein annular bodies at both ends of a forming drum are formed prior to an annular body therebetween, wherein each of said annular bodies has the same width and the number of annular bodies is four.

8. The method according to claim 7, wherein step (ii) is performed to set a width of the overlapping sides at 5 mm or more.

9. The method according to claim 7, wherein the tire has a tire cross section height of less than 110 mm and comprises (a) a belt layer disposed outside of a carcass layer where a tread portion of the tire is formed, wherein the belt layer ends at point E proximately where the tread portion ends when viewed in a cross section perpendicular to a tire circumferential direction; and (b) the inner liner layer disposed inside of the carcass layer, wherein step (i), (ii), or (iii) is performed to place the annular body to extend through a region defined between point E and point W where the width of the tire is maximum when viewed in the cross section.

10. The method according to claim 7, wherein steps (i), (ii), and (iii) are performed to position the joint portions of the annular bodies at positions shifted in the circumferential direction at approximately equal intervals.

* * * * *